United States Patent [19]

Jaliwala et al.

[11] 4,343,276
[45] Aug. 10, 1982

[54] TURBOCHARGER BOOST FEEDBACK CONTROL FOR ENGINE GOVERNOR

[75] Inventors: Salim A. Jaliwala; Eric Day, both of Columbus, Ind.

[73] Assignee: Cummins Engine Company, Inc., Columbus, Ind.

[21] Appl. No.: 225,526

[22] Filed: Jan. 16, 1981

[51] Int. Cl.³ .............................................. F02D 1/06
[52] U.S. Cl. ................................... 123/383; 123/367; 123/374
[58] Field of Search ............... 123/383, 374, 382, 367, 123/385-388

[56] References Cited

U.S. PATENT DOCUMENTS

| | | | |
|---|---|---|---|
| 2,229,048 | 1/1941 | Colell | 123/382 |
| 2,926,681 | 3/1960 | Chilman | 137/34 |
| 3,077,873 | 2/1963 | Parks et al. | 123/383 |
| 3,139,875 | 7/1964 | Link | 123/375 |
| 3,795,233 | 3/1974 | Crews et al. | 123/383 |
| 3,818,883 | 6/1974 | Glassey | 123/383 |
| 3,986,487 | 10/1976 | Yanai | 123/383 |
| 4,149,507 | 4/1979 | Little, Jr. et al. | 123/383 |
| 4,157,701 | 6/1979 | Holtrop | 123/383 |

*Primary Examiner*—Ira S. Lazarus
*Assistant Examiner*—Magdalen Moy
*Attorney, Agent, or Firm*—Neuman, Williams, Anderson & Olson

[57] ABSTRACT

An add-on feedback control unit is connected to an existing mechanical governor for a turbocharged engine to control fuel flow to the engine in response to engine load and thereby maintain an adjustable low speed droop for the engine. The preload on the governor control spring is determined by a movable stop, the position of which is controlled by a pivotally mounted reset lever. A control arm is connected to the reset lever at a selected position relative to the pivotal axis of the latter. The control unit includes a housing having an interior chamber separated into first and second subchambers by a diaphragm disposed therein. One side of the diaphragm is subjected to the turbocharger boost air pressure of the engine. The control arm includes a shaft connected to the opposite side of the diaphragm and having an outwardly projecting end portion connected to the reset lever at the selected position to provide feedback in response to engine load. The engine speed is trimmed by adjusting the length of the control arm shaft, and engine speed droop is adjusted by varying the distance between the selected position and the pivotal axis of the reset lever.

6 Claims, 3 Drawing Figures

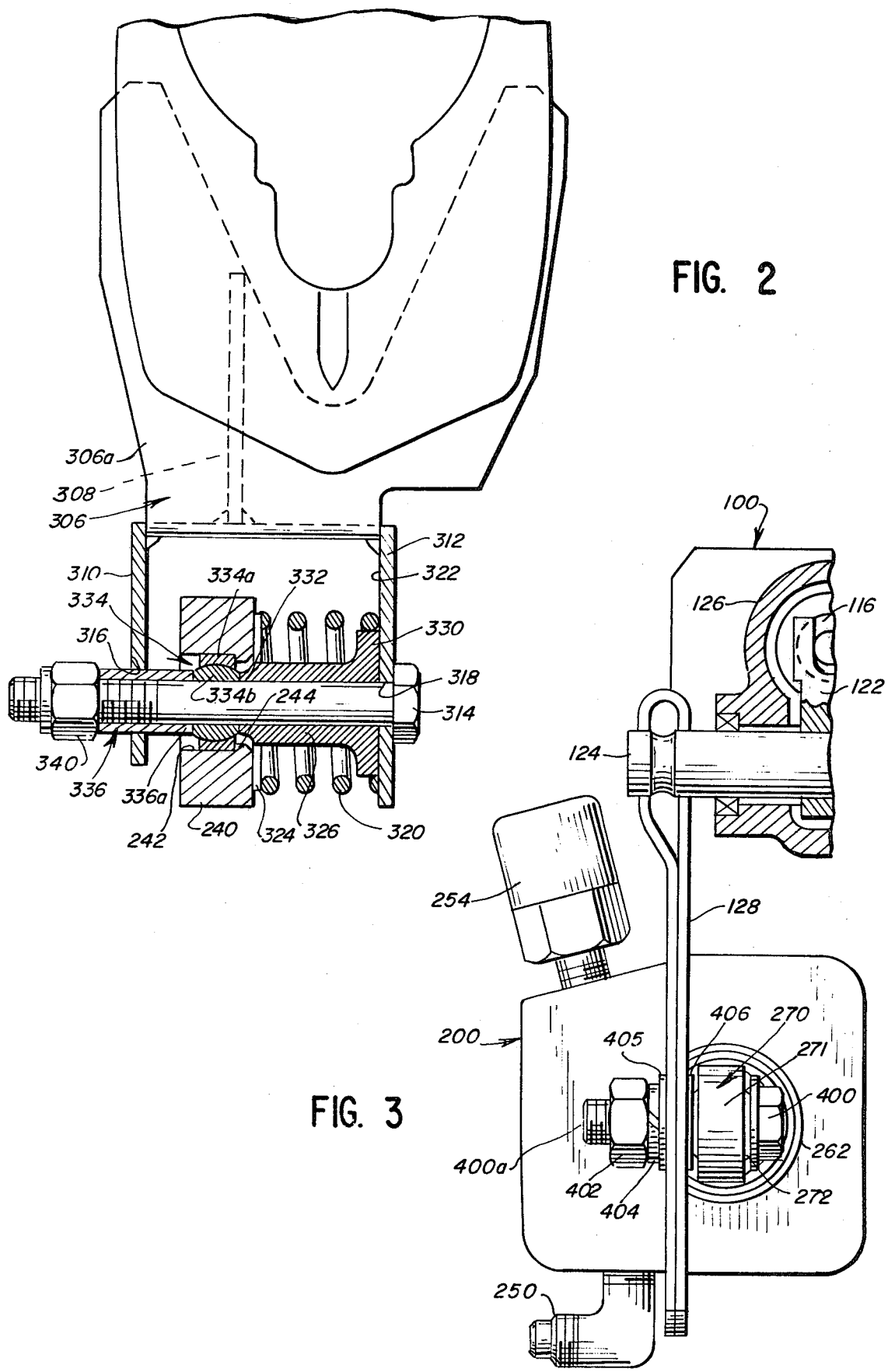

TURBOCHARGER BOOST FEEDBACK CONTROL FOR ENGINE GOVERNOR

BACKGROUND OF THE INVENTION

This invention relates generally to a governor for an internal combustion engine and more particularly to a turbocharger boost feedback control unit for use with such a governor to control the speed droop characteristics of the engine as load is applied to and removed from the engine.

Internal combustion engines are often equipped with maximum speed governors to insure that the engine does not destroy itself due to runaway if the fuel supply to the engine is not reduced on sudden removal of a driven load. Conventional governors are generally of the mechanical variety including flyweights which are rotated to generate a centrifugal force. The centrifugal force is applied axially to a fuel control shaft, the axial motion of which is opposed by a governor spring. The interaction of the centrifugal force generated by the flyweights and the spring force regulates fuel flow to the engine. Such mechanical governors are used because they are inexpensive and reliable due to their mechanical simplicity.

To insure the stability of an engine controlled by a mechanical governor, the engine speed is allowed to drop slightly as the load on the engine is increased. This speed characteristic is referred to as speed droop and is defined as the percentage change in engine speed from no load to full load as a fraction of the full load speed. A speed droop of at least ten percent (10%) is normally allowed to insure stability of an engine governor system.

Oftentimes, however, a limited speed droop is required in the operation of an engine governor system. For example, an engine which is driving an electrical generator must be maintained at a defined frequency (typically 50 or 60 hertz) within relatively narrow tolerances. Where such engine speed control is required, special governors are normally used which result in an increased cost for the engine governor system. Hydraulicservo governors, with independent drives and elaborate compensating circuits, can be used to maintain speed droop from isochronous to seven percent (7%). Powerful electromagnetic actuators driven by electronic control units are also used to maintain engine speeds by modulating a fuel pump throttle control. Yet another arrangement controls the fuel between the pump and the fuel injecting system under the control of a single stage electro-hydraulic valve. All of these special governors are add-on devices which are capable of precisely controlling the speed of an associated engine. However, all are considerably more expensive than the conventionally used mechanical governors.

SUMMARY OF THE INVENTION

In accordance with the present invention, a feedback control unit is connected to an existing mechanical governor (flyweight/spring) for a turbocharged engine to control the engine fuel flow in response to the engine load to maintain an adjustable, low speed droop for the engine governor system. Speed governing is still performed by the conventional flyweight/spring mechanism of the governor. However, the fuel flow setting or break point of the governor is continually adjusted by the feedback control unit in response to the air pressure of the engine turbocharger boost which is proportional to the load applied to the engine during steady state conditions. The air pressure of the engine turbocharger boost is thus used to predict the fuel flow setting required by the engine to maintain an approximately constant speed of operation for the engine and thus maintain a low speed droop as engine load varies. The characteristic slight delay in build-up of turbocharger boost air pressure maintains the stability of the engine governor system while operating at low speed droop.

The control unit of the present invention comprises a diaphragm which is centrally mounted within a housing chamber to form the latter into first and second subchambers on opposite sides of the diaphragm. The first subchamber is connected to the turbocharger boost and the second subchamber is connected to ambient atmosphere through a filter. The diaphragm housing is trunnion mounted on a bracket attached to the exterior of the governor. First and second springs are included within the first and second subchambers respectively to bias the diaphragm. A feedback control shaft is connected to the diaphragm and extends into the second subchamber and out through an opening formed in the second subchamber. The opening is opposite to the trunnion mounting of the housing. A connecting member terminating in an eye at one end is disposed externally of the housing and is adjustably secured to the outwardly extending end of the control shaft.

The governor includes a governor spring which interacts through a fuel control shaft with a centrifugal force generated by rotating flyweights. The position and accordingly the preload on the governor spring is determined by a movable spring stop, the movement of which is controlled by a pivotally mounted reset lever. The feedback control shaft is connected by the connecting member to the reset lever at a selected position relative to the pivotal axis of the reset lever. The preload force on the governor spring is adjusted by pivoting the reset lever. This spring force determines the fuel flow setting or break point of the governor.

Engine speed is finely adjusted or trimmed by adjusting the relative position of the connecting member on the control shaft, and the engine speed droop is adjusted by varying the selected position of the connection between the connecting member and the reset lever relative to the pivotal axis of the reset lever.

Advantageously, the control unit is constructed for use with an inexpensive diaphragm and can be added to an existing governor to adjustably maintain the speed trim of an engine and adjustably control the speed droop of the engine as engine load is added or removed. Varying the selected position of connection between the connecting member and the reset lever permits a highly accurate and sensitive adjustment of speed droop.

BRIEF DESCRIPTION OF THE DRAWING

For a more complete understanding of this invention, reference should now be made to the embodiment illustrated in greater detail in the accompanying drawing figures and described below by way of example of the invention. In the drawing:

FIG. 2 is a fragmentary sectional view taken along line 2—2 of FIG. 1.

FIG. 3 is a fragmentary right side elevational view of the assembly of FIG. 1 and showing the governor in partial section.

Figure 1:
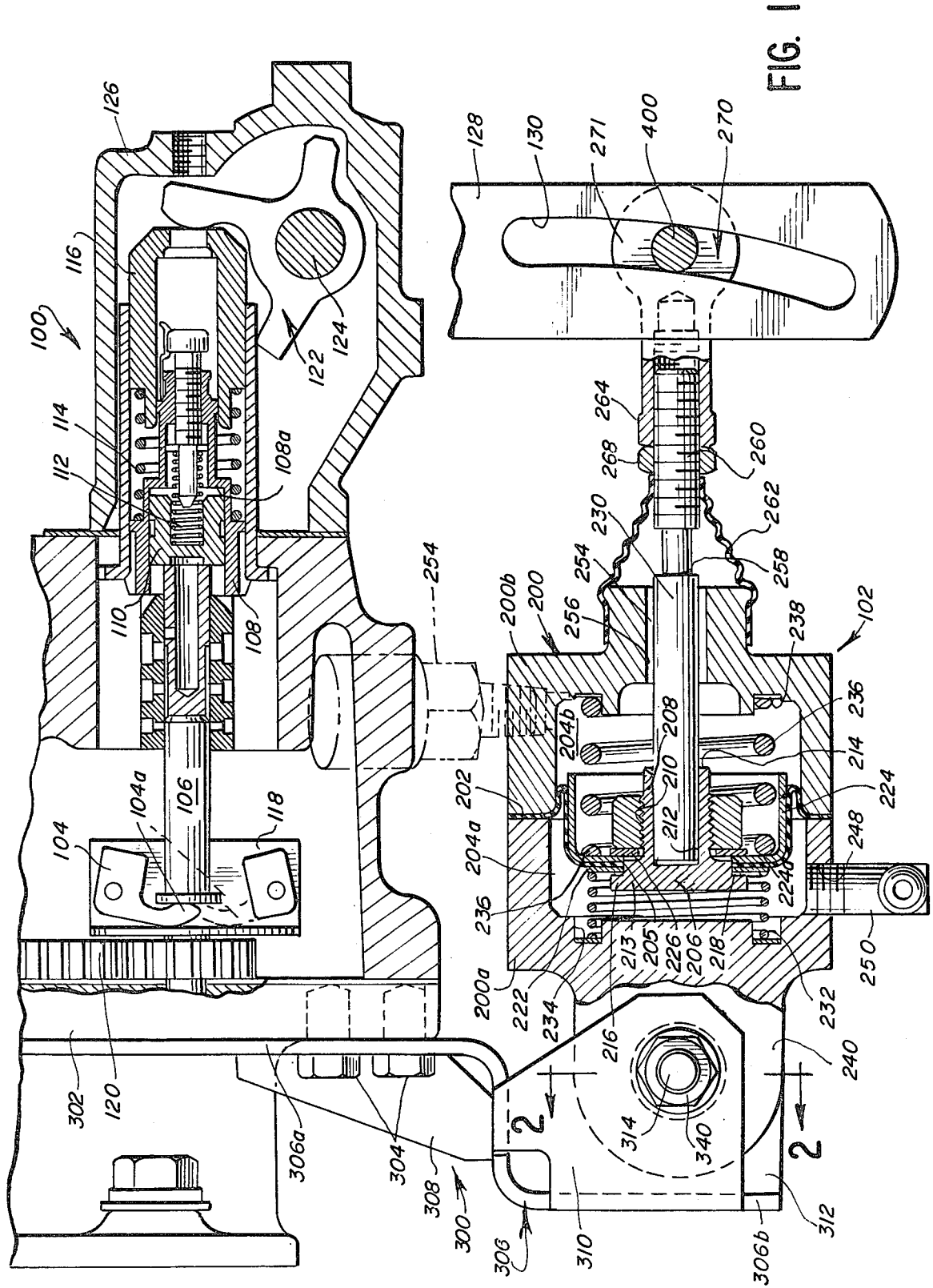
FIG. 1 is a partially sectioned side view of an existing engine governor, a portion of the associated fuel system and one form of the turbocharger boost feedback control unit of the present invention.

It should be understood that the drawing figures are not necessarily to scale and that certain details have been omitted to facilitate understanding of the present invention.

DETAILED DESCRIPTION OF THE ILLUSTRATIVE EMBODIMENT

Referring now to FIG. 1 a mechanical governor 100 for an internal combustion engine is shown in combination with a turbocharger boost feedback control unit 102 to adjustably maintain the speed trim and the speed droop of the engine. The governor 100 is of conventional design and includes flyweights 104 engaging and end of a fuel control shaft 106 to effect endwise movement of the latter. Shaft 106 actuates a member 108 through a cylindrical piece 110 which engages the end of the shaft and is slidably mounted within the member 108, and an engine idle control spring 112 which engages the side of the piece opposite the shaft 106. Member 108 engages one end of a main governor spring 114. The opposite end of spring 114 engages a cylindrical spring stop 116.

The flyweights 104 are pivotally connected to a plate 118 which is rotated by a gear 120 at a speed proportional to the governor controlled engine speed. The flyweights 104 generate a centrifugal force which is applied to the fuel control shaft 106 through the arms 104a of the flyweights 104 which axially move the shaft 106 to the right as shown in FIG. 1 thereby reducing in a conventional manner the fuel flow to the engine and accordingly the speed of the engine.

For normal engine operating speeds, the spring 112 is compressed to the point where the piece 110 engages a shoulder 108a formed on the member 108 whereby further axial motion of shaft 106 to the right is opposed by the force of the main governor spring 114. The maximum fuel flow and accordingly the speed of the engine controlled by the governor 100 is effected by the relative position of the stop 116 which determines the preload on the main governor spring 114. The relative position of stop 116 is determined by a reset lever 122 which is pivotally mounted for movement about the axis of a shaft 124 disposed within a governor housing 126. The fuel system which includes the governor 100 is well known and commercially available and therefore will not be further described. One form of such a governor is disclosed in U.S. Pat. No. 3,139,875 issued July 7, 1964.

One embodiment of the improved turbocharger boost feedback control unit 102 comprises a diaphragm housing 200 having a first section 200a and a second section 200b. The sections 200a and 200b are connected together in end to end relation and have sandwiched therebetween the periphery of a diaphragm 202. The diaphragm 202 extends completely across an interior chamber 204 of housing 200 and forms said chamber into a first subchamber 204a and a second subchamber 204b.

The diaphragm 202, which flexes a response to a predetermined force differential, is provided with a central aperture 205 for receiving a generally cylindrical shaft-engaging member 206 having an elongated first portion 208 protruding in one direction from the diaphragm into the subchamber 204b. Portion 208 is of cylindrical configuration and is provided with external threads 210. An open end cylindrical interior pocket 212 is formed in portion 208 and is substantially coextensive therewith. The pocket open end 214 is chamfered to facilitate inserting therethrough the end of a shaft 230.

Member 206 also includes a second portion 213 disposed on the opposite side of the diaphragm 202 and within subchamber 204a. Portion 213 has an external collar 216 having a diameter greater than the diameter of the aperture 205 of the diaphragm 202. The shaft-engaging member 206 is secured to diaphragm 202 by a seal 218 sandwiched between the collar 216 and a washer 222, the latter contacting one surface of diaphragm 202 exposed to the subchamber 204a.

A generally cylindrical cup-shaped member 224 is disposed within subchamber 204b and has the base 224a thereof contacting the other surface of diaphragm 202. The open side of member 224 faces away from the diaphragm. A washer 226 is fitted over portion 208 and is held against the member base 224a by a nut 228 threaded onto the external threads 210 of portion 208 after the end of shaft 230 has been inserted into pocket 212. The portion 208 is formed such that the control shaft 230 is securely retained within pocket 212 when the nut 228 is tightened against the base 224a. Collar 216, seal 218, washer 222, base 224a of member 224, washer 226 and nut 228 coact with one another to firmly connect the member 206 to diaphragm 202 and hermetically seal the aperture 205 thereof.

Disposed within subchamber 204a is a first diaphragm biasing spring 232 having one end thereof positioned in an annular seat 234 formed in housing section 200a. The opposite end of spring 232 engages washer 222 whereby the latter prevents spring 232 from damaging diaphragm 202. A second diaphragm biasing spring 236 is positioned within subchamber 204b between a spring seat 238 formed in housing section 200b and the member base 224a.

A bracket 300 is provided which is designed to be mounted by a plurality of anchor bolts 304 on the exterior of a housing 302 for the fuel system, see FIGS. 1 and 2. The mounting bracket 300 comprises a back plate 306 having an upper section 306a for receiving the mounting bolts 304 and an offset lower section 306b as shown in FIG. 1. A reinforcing rib 308 extends between sections 306a, 306b and is welded or otherwise firmly affixed thereto in a position so as not to interfere with the remainder of the fuel system housing 302. Two spaced parallel panels 310 and 312 are welded or otherwise firmly affixed to opposite sides of the back plate lower section 306b. Positioned between the panels is the trunnion mounting assembly for the housing 200.

Housing section 200a has an exterior protuberance or tongue-like extension 240 which is provided with a central transverse aperture 242. The trunnion mounting assembly, as shown in FIG. 2, comprises the mounting bolt 314 which extends through apertures 316 and 318 formed in the panels 310 and 312, respectively, and through the extension aperture 242 aligned therewith. The trunnion mounting assembly also includes a spring 320 which is disposed between the interior surface 322 of the panel 312 and a washer 324 which encompasses a sleeve 326. Sleeve 326 has an enlarged head 330 at one end which abuts the interior surface 322 of panel 312 and serves as a guide for one end of spring 320. The opposite end of sleeve 326 forms a tapered end section 332 which extends into the aperture 242 of extension 240. As seen in FIG. 2, aperture 242 is provided with an internal inwardly projecting annular flange 244 which is disposed adjacent the end of the aperture 242 into which the sleeve tapered end section 332 extends. Disposed within aperture 242 and engaging flange 244 is the outer race 334a of a spherical bearing 334. The bearing race 334a is held against flange 244 by a tubular section 336 which encompasses a shank portion of mounting bolt 314 and has the inner end 336a of section 336 engaging the inner segment 334b of bearing 334. Section 336 projects through the aperture 316 formed in panel 310 and has the exposed end thereof engaged by a nut 340 threaded onto the threaded end of bolt 314. The end face 246 of the extension aperture 242 is chamfered.

The spherical bearing 334 allows pivotal movement as well as tilting motion of the diaphragm housing 200 about bolt 314. The tongue-like extension 240 is maintained in proper orientation relative to the mounting panels 310, 312 by the spring 320. However, the limited tilting motion permitted by spherical bearing 334 insures proper alignment of the control unit 102 during operation.

The subchamber 204a within housing 200 is provided with a port 248 which is connected to the turbocharger boost air pressure of the associated engine controlled by the governor 100. A fitting 250 facilitates this connection.

Subchamber 204b, on the other hand, includes a port 252 which opens to the atmosphere through a filter 254. The filter prevents foreign matter from being drawn into subchamber 204b during operation of the control unit 102.

Control shaft 230 slidingly engages a sleeve bearing 254 mounted within an opening 256 formed in housing section 200b, see FIG. 1. A portion of shaft 230 projects outwardly from the opening 256 and has an annular exterior groove 258 formed therein. Extending axially from groove 258 is a threaded terminal portion 260. A bellows-type dust cover 262 substantially conceals the outwardly projecting exposed portion of shaft 230, including the groove 258 and the initial threads of terminal portion 260. Terminal portion 260 is threadedly connected to an internally threaded sleeve portion 264, the latter forming a part of a connecting member 270. Once the sleeve portion 264 has been threaded onto the shaft terminal portion 260 the desired amount, it is locked in position by the lock nut 268 which is threaded onto terminal portion 260 and drawn up tight against the end of sleeve portion 264. The connecting member 270 also includes an eye portion 271 which is connected to a control arm 128 forming a part of reset lever 122 by a transversely extending bolt 400 carried by portion 271. A portion of the bolt shank extends through a curvilinear slot 130 formed within control arm 128. The upper end portion of control arm 128 pivots as a unit with lever 122 about the axis of shaft 124.

Eye portion 271 carries a spherical bearing 272 for bolt 400 so as to allow slight universal motion of the eye portion 271 relative to the bolt 400. The portion of the bolt shank extending through slot 130 is retained in a selected position within the slot by a lock assembly which includes a nut 402, lock washer 404, and washers 405, 406, see FIG. 3. Washers 405, 406 are disposed on opposite sides of control arm 128, and lock washer 404 is sandwiched between washer 405 and the nut 402 which is threaded onto the end 400a of bolt 400.

As aforementioned, the turbocharger boost air pressure is introduced into the housing subchamber 204a via port 248 and counteracts the bias of spring 236 through the diaphragm 202. Normally, spring 236 is approximately twenty (20) times stiffer than the main governor control spring 114. This fact, together with the size of the diaphragm 202 and the mechanical advantage provided by the length of control arm 128, allows control unit 102 to act as a displacement driver for the stop 116 which engages one end of main governor spring 114. Since the turbocharger boost air pressure is directly proportional to the load applied to the engine, the diaphragm and connected control shaft 230 move to the right as the engine load increases. This motion is transmitted to stop 116 through control arm 128 of reset lever 122 to effect resetting of the control point of governor 100 and provide a higher fuel flow to the associated engine. When a reduced engine load occurs, a reverse operation results causing a reduction in the fuel flow allowed to the engine by the governor 100.

Inherent delay in the changing of the turbocharger boost air pressure in response to changes in engine load insure the stability of the engine governor system. By varying the threaded connection between the sleeve portion 264 of member 270 and the terminal portion 260 of shaft 230, the effective length of the shaft 230 can be changed, as desired, so as to control the preloading of the governor spring 114 and thus enable the engine speed to be trimmed or finely adjusted. Engine speed droop is controlled by varying the selected position of the bolt 400 carried by the eye portion 271 within the slot 130 of the control arm 128. Since the axial displacement stroke of the shaft 230 is constant, greater feedback and lower speed droop result from a shorter effective lever length or by moving the bolt shank towards the top portion of slot 130. Conversely, the speed droop can be raised by increasing the effective lever length or by moving the bolt shank towards the bottom portion of slot 130. A variety of springs can be selected for diaphragm spring 236 so as to change the boost pressure to stroke ratio of the diaphragm assembly to be compatible with the turbocharger of a particular engine model.

From the above description, it is apparent that a low cost, add-on feedback control unit responsive to the turbocharger boost pressure of a governor controlled engine has been disclosed for controlling the main governor spring of a mechanical flyweight/spring governor to adjustably maintain a low speed droop for the engine. While only a single embodiment has been set forth, alternative embodiments and various modifications will be apparent to those skilled in the art from the above description. For example, various pivotal mountings and connecting links could be utilized for the control unit in accordance with the present invention. These and other alternative embodiments and modifications are considered equivalents and within the spirit and scope of the present invention.

What is claimed is:

1. A turbocharger boost feedback control unit for use with a governor of an associated engine wherein the governor includes rotating flyweights interacting through a movable fuel control shaft with an opposing force of a governor spring, the relative forces due to the rotation of the flyweights and compression of the spring determining the position of the shaft and the fuel flow to the associated engine, the governor spring abutting one side of a movable stop axially aligned with the control shaft, the opposite side of the stop being engaged by a pivotally mounted lever means, said feedback control unit comprising:

a control arm being adapted to be adjustably connected to the lever means at a selected position relative to the pivotal axis of the lever means;

a fixedly mounted bracket;

a housing adjustably mounted on said bracket, said housing including an interior chamber in which is disposed a diaphragm separating said chamber into first and second subchambers, said first subchamber having a port for connecting to the turbocharger boost pressure of the associated engine, and said second subchamber having a port for connecting to the atmosphere;

a first spring mounted within said first subchamber;

and a second spring mounted within said second subchamber;

said control arm including a shaft fixedly mounted to said diaphragm and extending therefrom into said second subchamber and out through an axially aligned opening formed in said housing, and a connecting member having a first portion adjustably secured to the outwardly extending end of said control arm shaft and a second portion adapted to be connected to the lever means at the selected position whereby the speed droop of the associated engine is controlled by the location on the lever means of the selected position of connection between the lever means and the second portion of said connecting member.

2. The control unit of claim 1 wherein the housing includes an extension which is trunnion mounted on said bracket, and the second portion of the connecting member is adapted to engage an elongated curvilinear slot formed in the lever means wherein the lever means is maintained at a substantially constant attitude relative to said governor throughout the entire range of adjustment of the connecting member second portion with respect to said slot.

3. The control unit of claim 1 wherein the port of the second subchamber of said housing includes a filter.

4. The control unit of claim 1 wherein the portion of the control arm shaft extending out through the housing opening is substantially enclosed within an expandable cover means.

5. The control unit of claim 1 wherein said connecting member first portion is threadably connected to the portion of the control arm shaft extending out through the opening of said housing.

6. A turbocharger boost feedback control unit for addition to a governor of an associated engine wherein the governor includes rotating flyweights interacting through a movable fuel control shaft with one end of a governor spring, the relative force exerted by the rotation of the flyweights determining the amount of fuel fed to the associated engine and the speed/torque characteristics of the engine, a movable spring stop having one side thereof engaging the other end of the governor spring, and a pivotally mounted lever means engaging the other side of the movable spring stop, said feedback control unit comprising:

a control arm being adapted to be adjustably connected to the lever means at a selected position relative to the pivotal axis of the lever means;

a bracket for attachment to said governor;

a diaphragm;

a housing trunnion mounted on said bracket and having a first section and a second section connected thereto and coacting therewith to form an interior chamber in which said diaphragm is mounted, said diaphragm effecting separation of said chamber into independent first and second subchambers, said first subchamber having a port for connecting to the turbocharger boost pressure of the associated engine, and said second subchamber having a port for connecting to the atmosphere;

a first spring disposed within said first subchamber;

and a second spring disposed within said second subchamber, said first and second springs exerting opposing biasing forces on said diaphragm, said second spring exerting the greater biasing force;

said control arm including a shaft fixedly secured to said diaphragm and extending therefrom into said second subchamber and out through an axially aligned opening formed in said housing second section, said shaft being mounted for axial movement in response to flexure of said diaphragm, and a connecting member positioned externally of said housing and having a first portion adjustably secured to the outwardly extending end of said control arm shaft, and a second portion adapted to be adjustably secured to the lever means at the selected position;

the speed trim of the associated engine being dependent upon the relative adjustment of the connecting member first portion with respect to the outwardly extending end of the control arm shaft, and the speed droop of the associated engine being dependent upon the distance the selected position of connection between the connecting member and the lever means is from the piviotal axis of the lever means.

* * * * *